US012755158B2

(12) United States Patent
Lal et al.

(10) Patent No.: US 12,755,158 B2
(45) Date of Patent: Oct. 6, 2026

(54) GENERATING TRAINING DATA USING SAMPLED VALUES

(71) Applicant: Microsoft Technology Licensing, LLC, Redmond, WA (US)

(72) Inventors: Gopiram Roshan Lal, Sunnyvale, CA (US); Girish Kathalagiri, San Jose, CA (US); Alice Hing-Yee Leung, Sunnyvale, CA (US); Daqian Sun, Ithaca, NY (US); Aman Grover, San Carlos, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1140 days.

(21) Appl. No.: 17/849,506

(22) Filed: Jun. 24, 2022

(65) Prior Publication Data

US 2023/0419119 A1 Dec. 28, 2023

(51) Int. Cl.
*G06N 3/088* (2023.01)
*G06N 7/01* (2023.01)

(52) U.S. Cl.
CPC ............... *G06N 3/088* (2013.01); *G06N 7/01* (2023.01)

(58) Field of Classification Search
CPC .......... G06N 7/01; G06N 3/047; G06N 3/045; G06N 3/08
See application file for complete search history.

(56) References Cited

U.S. PATENT DOCUMENTS

2019/0370496 A1* 12/2019 Chen .................. G06F 21/6254
2021/0012267 A1* 1/2021 Fawaz .................... G06N 5/025
2022/0327373 A1* 10/2022 Chow ...................... G06N 3/08

OTHER PUBLICATIONS

Hu, Fenyu, et al. "Graph classification by mixture of diverse experts." arXiv preprint arXiv:2103.15622 (2021). https://arxiv.org/pdf/2103.15622 (Year: 2021).*

Chen, Hugh, Scott Lundberg, and Su-In Lee. "Checkpoint ensembles: Ensemble methods from a single training process." arXiv preprint arXiv: 1710.03282 (2017). https://arxiv.org/pdf/1710.03282 (Year: 2017).*

Fong, Simon, Raymond Wong, and Athanasios V. Vasilakos. "Accelerated PSO swarm search feature selection for data stream mining big data." IEEE transactions on services computing 9.1 (2015): 33-45. https://ieeexplore.ieee.org/stamp/stamp.jsp?tp=& arnumber=7115942 (Year: 2015).*

* cited by examiner

*Primary Examiner* — Michael H Hoang

(74) *Attorney, Agent, or Firm* — NICHOLSON DE VOS WEBSTER & ELLIOTT

(57) ABSTRACT

Methods, systems, and apparatuses include determining a set of data. The set of data includes multiple numerical ranges associated with an embedding and an attribute. The numerical range is sampled to obtain a sample value which is also associated with the embedding and the attribute. A set of sample value training data is generated, the set including the sample value, the associated embedding, and the associated attribute. A trained neural network prediction model is generated by applying a prediction model to the set of sample value training data. A set of input data is applied to the trained neural network prediction model. An output is determined by the trained neural network prediction model based on the set of input data. The output is a predicted range of values based on an output mean and an output standard deviation.

20 Claims, 7 Drawing Sheets

GENERATING TRAINING DATA USING SAMPLED VALUES

TECHNICAL FIELD

The present disclosure generally relates to generating training data, and more specifically, relates to generating training data using sampled values.

BACKGROUND ART

Machine learning is a category of artificial intelligence. In machine learning, a model is defined by a machine learning algorithm. A machine learning algorithm is a mathematical and/or logical expression of a relationship between inputs to and outputs of the machine learning model. The model is trained by applying the machine learning algorithm to input data. A trained model can be applied to new instances of input data to generate model output. Machine learning model output can include a prediction, a score, or an inference, in response to a new instance of input data. Application systems can use the output of trained machine learning models to determine downstream execution decisions, such as decisions regarding various user interface functionality.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the present disclosure are directed to generating training data from numerical ranges using sampled values. As data sets become larger and larger and as there are an ever-increasing number of data sets, it is difficult to create machine learning models to effectively cover these data sets.

Aspects of the present disclosure address the above and other deficiencies by generating training data from numerical ranges using sampled values to mix training sets for numerical ranges and discrete point values. By training a machine learning model on a number of sampled values, the model can learn the entire range of the values while still being compatible with discrete points. This allows a single machine learning model to use multiple different data sets and improves the coverage and accuracy of the model. For example, when handling salary data and salary estimations, it may be beneficial to consider salary ranges provided by job posters for posted jobs as well as discrete salary point data provided by and with the consent of individual users. The handling of salary data is one example use case to which this disclosure can be applied. This disclosure is applicable to other use cases in which numerical ranges of values are predicted based on different data sets including ranges and discrete data points.

Figure 1:
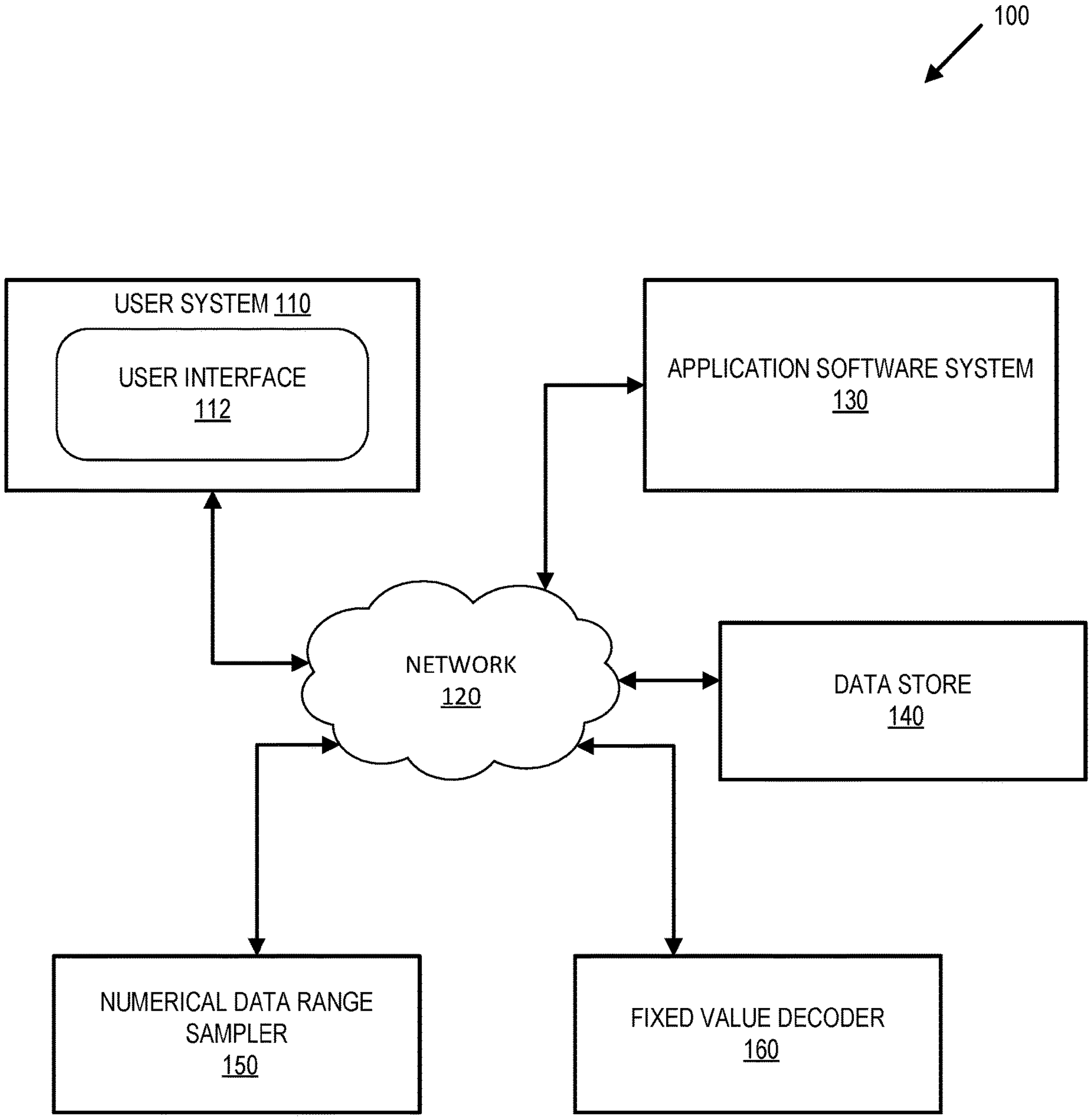
FIG. 1 illustrates an example computing system 100 that includes a numerical data range sampler 150 and a fixed value decoder 160 in accordance with some embodiments of the present disclosure.

FIG. 1 illustrates an example computing system 100 which includes a user system 110, a network 120, an application software system 130, a data store 140, a numerical data range sampler 150, and a fixed value decoder 160.

User system 110 includes at least one computing device, such as a personal computing device, a server, a mobile computing device, or a smart appliance. User system 110 includes at least one software application, including a user interface 112, installed on or accessible by a network to a computing device. For example, user interface 112 can be or include a front-end portion of application software system 130.

User interface 112 is any type of user interface as described above. User interface 112 can be used to input search queries and view or otherwise perceive output that includes data produced by application software system 130. For example, user interface 112 can include a graphical user interface and/or a conversational voice/speech interface that includes a mechanism for entering a search query and viewing query results and/or other digital content. Examples of user interface 112 include web browsers, command line interfaces, and mobile apps. User interface 112 as used herein can include application programming interfaces (APIs).

Data store 140 can reside on at least one persistent and/or volatile storage device that can reside within the same local network as at least one other device of computing system 100 and/or in a network that is remote relative to at least one other device of computing system 100. Thus, although depicted as being included in computing system 100, portions of data store 140 can be part of computing system 100 or accessed by computing system 100 over a network, such as network 120.

Application software system 130 is any type of application software system that includes or utilizes functionality provided by numerical data range sampler 150. Examples of application software system 130 include but are not limited to connections network software, such as social media platforms, and systems that are or are not be based on connections network software, such as an online network, general-purpose search engines, job search software, recruiter search software, sales assistance software, advertising software, learning and education software, or any combination of any of the foregoing.

While not specifically shown, it should be understood that any of user system 110, application software system 130, data store 140, numerical data range sampler 150, and fixed value decoder 160 includes an interface embodied as computer programming code stored in computer memory that when executed causes a computing device to enable bidirectional communication with any other of user system 110, application software system 130, data store 140, numerical data range sampler 150, and fixed value decoder 160 using a communicative coupling mechanism. Examples of communicative coupling mechanisms include network interfaces, inter-process communication (IPC) interfaces and application program interfaces (APIs).

A client portion of application software system 130 can operate in user system 110, for example as a plugin or widget in a graphical user interface of a software application or as a web browser executing user interface 112. In an embodiment, a web browser can transmit an HTTP request over a network (e.g., the Internet) in response to user input that is received through a user interface provided by the web application and displayed through the web browser. A server running application software system 130 and/or a server portion of application software system 130 can receive the input, perform at least one operation using the input, and return output using an HTTP response that the web browser receives and processes.

Each of user system 110, application software system 130, data store 140, numerical data range sampler 150, and fixed value decoder 160 is implemented using at least one computing device that is communicatively coupled to electronic communications network 120. Any of user system 110, application software system 130, data store 140, numerical data range sampler 150, and fixed value decoder 160 can be bidirectionally communicatively coupled by network 120. User system 110 as well as one or more different user systems (not shown) can be bidirectionally communicatively coupled to application software system 130.

A typical user of user system 110 can be an administrator or end user of application software system 130, numerical data range sampler 150, and/or fixed value decoder 160. User system 110 is configured to communicate bidirectionally with any of application software system 130, data store 140, numerical data range sampler 150, and/or fixed value decoder 160 over network 120.

The features and functionality of user system 110, application software system 130, data store 140, numerical data range sampler 150, and fixed value decoder 160 are implemented using computer software, hardware, or software and hardware, and can include combinations of automated functionality, data structures, and digital data, which are represented schematically in the figures. User system 110, application software system 130, data store 140, numerical data range sampler 150, and fixed value decoder 160 are shown as separate elements in FIG. 1 for ease of discussion but the illustration is not meant to imply that separation of these elements is required. The illustrated systems, services, and data stores (or their functionality) can be divided over any number of physical systems, including a single physical computer system, and can communicate with each other in any appropriate manner.

Network 120 can be implemented on any medium or mechanism that provides for the exchange of data, signals, and/or instructions between the various components of computing system 100. Examples of network 120 include, without limitation, a Local Area Network (LAN), a Wide Area Network (WAN), an Ethernet network or the Internet, or at least one terrestrial, satellite or wireless link, or a combination of any number of different networks and/or communication links.

Figure 7:
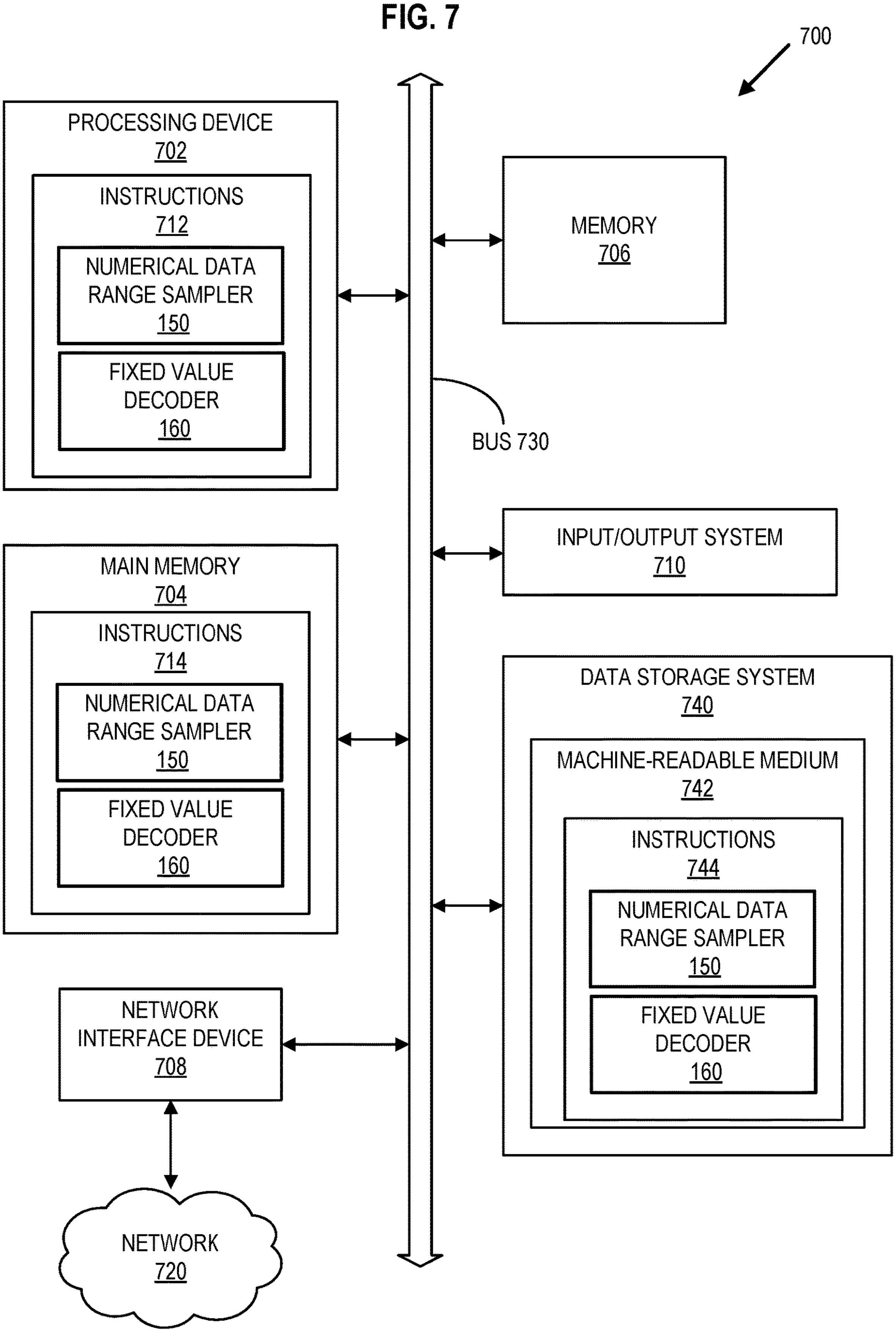
FIG. 7 is a block diagram of an example computer system in which embodiments of the present disclosure can operate.

The computing system 110 includes a numerical data range sampler component 150 that can sample numerical data ranges to train a machine learning model. In some embodiments, the application software system 130 includes at least a portion of the numerical data range sampler component 150. As shown in FIG. 7, the numerical data range sampler component 150 can be implemented as instructions stored in a memory, and a processing device 702 can be configured to execute the instructions stored in the memory to perform the operations described herein.

The numerical data range sampler component 150 can sample numerical data ranges to train a machine learning model. The disclosed technologies can be described with reference to an example use case of sampling salary range data to train a machine learning model on the entirety of the salary range; for example, for use by a social graph application such as a professional social network application. The disclosed technologies are not limited to social graph applications but can be used to perform numerical range sampling to train machine learning models more generally. The disclosed technologies can be used by many different types of network-based applications in which numerical ranges, instead of discrete values, are useful as inputs to a machine learning model.

The computing system 110 includes a fixed value decoder component 160 that can decrypt fixed value data and associated embeddings and attribute data to train a machine learning model. In some embodiments, the application software system 130 includes at least a portion of the fixed value decoder component 160. As shown in FIG. 7, the fixed value decoder component 160 can be implemented as instructions stored in a memory, and a processing device 702 can be configured to execute the instructions stored in the memory to perform the operations described herein.

The fixed value decoder component 160 can decrypt fixed value data and associated embeddings and attribute data to train a machine learning model. The disclosed technologies can be described with reference to an example use case of decrypting private, user-submitted salary information to train a machine learning salary estimation model; for example, for use by a jobs component of a social graph application such as a professional social network application or other types of applications that enable users to search for jobs, view job postings and job-related analytics, and apply for jobs. The disclosed technologies are not limited to social graph applications but can be used to perform data decryption and machine learning model training more generally. The disclosed technologies can be used by many different types of network-based applications in which private information is helpful to train machine learning models.

Further details with regards to the operations of the numerical data range sampler component 150 and fixed value decoder 160 are described below.

Figure 2:
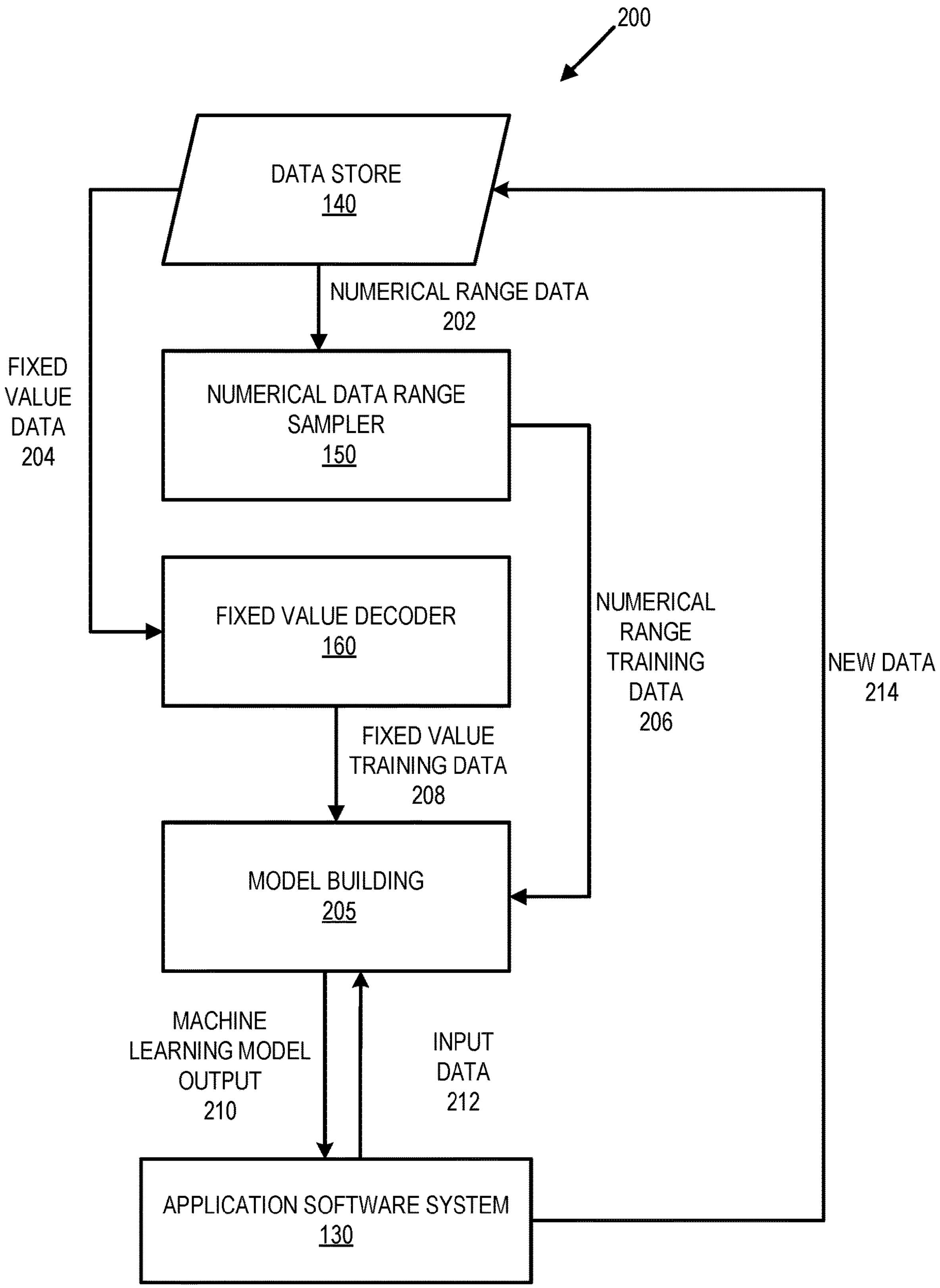
FIG. 2 is a block diagram of an exemplary system 200 to generate training data using sampled values in accordance with some embodiments of the present disclosure.

FIG. 2 is a block diagram of an exemplary system 200 to generate training data using sampled values in accordance with some embodiments of the present disclosure. Exemplary system 200 includes data store 140, numerical data range sampler 150, fixed value decoder 160, model building component 205, and application software system 130.

Numerical data range sampler 150 receives numerical range data 202 from data store 140. In some embodiments, data store 140 receives the numerical range data 202 from job listings posted on application software system 130 or on other websites. In other embodiments, numerical range data 202 is scraped from publicly available information on the internet. In still other embodiments, numerical range data 202 includes data from a number of different sources including job listings and publicly available information. The numerical range data 202 includes numerical range values and associated embeddings data and attribute data. Numerical data range sample 150 samples numerical range values and combines the sampled values with embeddings and attributes associated with the numerical range data from which the sampled value was sampled to obtain numerical range training data 206. An example of numerical range values is a salary range for a job posting. Examples of sampled values are individual salary values sampled from the salary range. An example of an embedding is a vector that defines a relation between different jobs or groups of jobs. For example, an embedding could represent the similarity of different jobs across a number of attributes such as location, industry, and required skills. In some embodiments, embeddings are the result of machine learning models correlating similarities between different jobs and the exact attributes used to determine similarity may not be clear. Examples of attributes are categories associated with a job posting including an entity associated with the job, a title of the job, a location of the job, skills relating to the job, an industry associated with the job, and combinations of the above. An example of numerical range training data is a group of training vectors, where each vector includes a salary sampled from the salary range, an embedding, and a group of attributes. Numerical data range sampler 150 sends numerical range training data 206 to model building 205 to be used in training a machine learning model.

Fixed value decoder 160 receives fixed value data 204 from data store 140. The fixed value data 204 includes encrypted fixed values and associated fixed value embeddings data and fixed value attribute data. An example of encrypted fixed values is a salary for a user's job, which has been encrypted for privacy. An example of associated fixed value embeddings is a vector that defines a relationship between the user's job and different jobs or groups of jobs. An example of fixed value attribute data is categories associated with the user's job including a current job title of the user, a current location of the user, a current location of the user's job, an entity associated with the user's job, an industry associated with the user's job, an industry associated with the user and combinations of the above. Fixed value decoder 160 decrypts the encrypted fixed values and associated encrypted fixed value embeddings data and encrypted fixed value attribute data. Fixed value decoder 160 combines the decrypted data into fixed value training data 206 and sends fixed value training data 206 to model building 205 to be used in training a machine learning model.

Model building 205 receives numerical range training data 206 and fixed value training data 208 from numerical data range sampler 150 and fixed value decoder 160 respectively. Model building 205 trains a machine learning model using numerical range training data 206 and fixed value training data 208. Model building 205 also receives input data 212 from application software system 130. An example of input data is an input to the trained machine learning model that outputs a predicted salary range. For example, input data could be a vector of embeddings and attributes that cause the machine learning model to predict a salary range. In response to receiving input data 212 from application software system 130, model building 205 determines a machine learning model output 210 based on inputting input data 212 into the machine learning model trained on numerical range training data 206 and fixed value training data 208. An example of the machine learning model output is a salary or salary range predicted based on the input data. Model building 205 sends machine learning model output 210 to application software system 130. In some embodiments, application software system 130 sends machine learning model output 210 to a user system, such as user system 110 of FIG. 1 for display on a user interface, such as user interface 112 of FIG. 1.

In some embodiments, application software system 130 receives new data 214 from a user system, such as user system 110 of FIG. 1 and sends new data 214 to be stored in data store 140. For example, application software system 130 may send new numerical range data and new fixed value data to be stored in data store 140 and may later be sent to one of numerical data range sample 150 and fixed value decoder 160.

Figure 3:
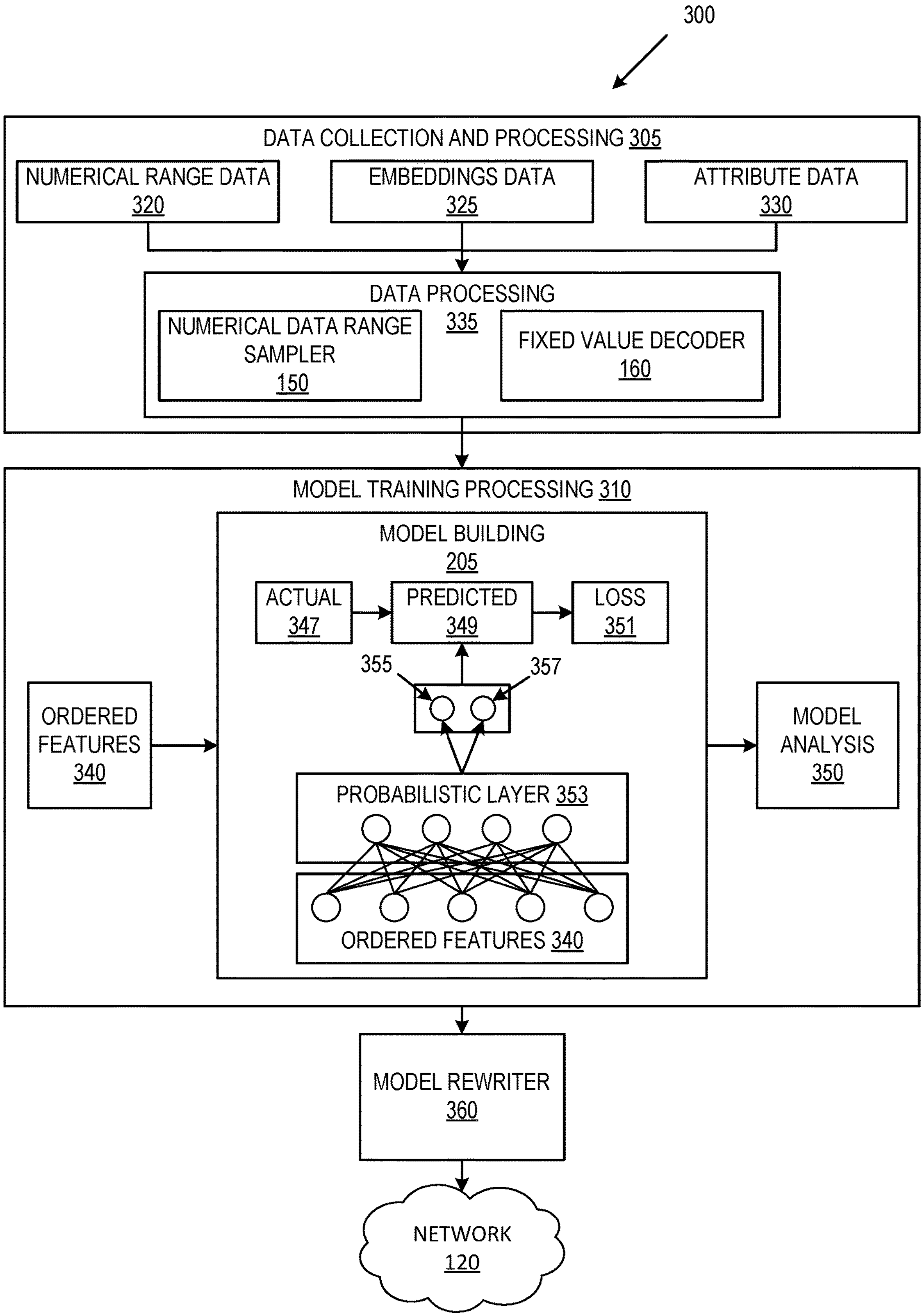
FIG. 3 is a block diagram of an exemplary system 300 for generating training data using sampled values in accordance with some embodiments of the present disclosure.

FIG. 3 is a block diagram of an exemplary system 300 for generating training data using sampled values in accordance with some embodiments of the present disclosure. As shown in FIG. 3, exemplary system 300 for generating training data using sampled values includes data collection and processing component 305, which is coupled to model training processing component 310, which is in turn coupled to model rewriter 360, which is in turn coupled to network 120. Data collection and processing component 305, model training processing component 310, model rewriter 360, and network 120 may have other connections and couplings not illustrated here.

Data collection and processing component 305 includes numerical range data 320, embeddings data 325, and attribute data 330. Data collection and processing component 305 also includes data processing component 335 which includes numerical data range sampler component 150 and fixed value decoder 160. In some embodiments, numerical range data 320, embeddings data 325, and attribute data 330 are stored in a data store, such as data store 140 from FIG. 1. In other embodiments, numerical range data 320, embeddings data 325, and attribute data 330 are stored in one or both of numerical data range sampler 150 and fixed value decoder 160. In still other embodiments, numerical range data 320, embeddings data 325, and attribute data 330 are stored in an application software system, such as application software system 130 of FIG. 1.

Numerical range data 320 includes numerical ranges associated with embeddings from embeddings data 325 and attributes from attribute data 330. In some embodiments, numerical range data 320 includes salary ranges associated with a job or a job posting. The job or job posting is also associated with attributes from attribute data 330 which include: an entity associated with the job, a title of the job, a location of the job, skills relating to the job, an industry associated with the job, and combinations of the above.

In some embodiments, the job or job posting is also associated with sample value embeddings, also called job embeddings, from embeddings data 325. The job embeddings are vectors that define a relation between different jobs or groups of jobs. The job embeddings also carry information about the job itself, including information stored in attributes associated with the job, such as the attributes explained above. The job embeddings also carry information about interactions between users and jobs. For example, users of a professional social network may interact with content including job postings. Information regarding these user interactions is stored in the job embeddings.

In some embodiments, numerical range data 320 includes fixed values as well as the numerical ranges. The fixed values are also associated with fixed value embeddings from embeddings data 325 and fixed value attributes from attribute data 330. In some embodiments, the fixed values may be salary data for a user of the professional social network. In such embodiments, the fixed values are stored separately from the numerical ranges and are encrypted. The user of the professional social network and therefore their fixed value salary data is also associated with fixed value attributes from attribute data 330, which include: a current job title of the user, a current location of the user, a current location of the user's job, an entity associated with the user's job, an industry associated with the user's job, an industry associated with the user and combinations of the above.

In some embodiments, the user of the professional social network is also associated with sample value embeddings, also called career embeddings, from embeddings data 325. The career embeddings are vectors that define a relation between the user and other users or a relation between the user and jobs. The career embeddings also carry information about the user themselves, including information stored in attributes associated with the user, such as the attributes explained above. The career embeddings also carry information about interactions between the user and jobs. For example, the user may interact with content including job postings. Information regarding these user interactions is stored in the career embeddings.

Numerical data range sampler component 150 receives numerical range data 320 and prepares numerical range data 320 for model training processing component 310. For example, numerical data range sampler component 150 receives numerical range data 320 which is associated with embeddings data 325 and attribute data 330. Numerical data range sampler component 150 samples a single numerical value from the numerical range data 320. The sampled value is associated with the same embeddings from embeddings data 325 and the same attributes from attribute data 330 as the numerical range that the sampled value was sampled from. Numerical range sampler component 150 samples the same range multiple times so that model training processing component 310 can learn the entire numerical range from the sampled values.

In some embodiments, numerical data range sampler component 150 samples the numerical ranges using uniform sampling within the numerical range. For example, numerical data range sampler component 150 may sample equally spaced points or certain percentiles within a range, such as the bottom, middle, and top of the range. In other embodiments, numerical data range sampler component 150 obtains samples randomly. For example, numerical data range sampler component 150 uses probabilistic sampling of random sampling points controlled by a fixed distribution to obtain samples. Although the number of samples that numerical data range sampler component 150 obtains is not set, the more samples taken generally correlates with a better understanding of the entirety of the numerical range.

Fixed value decoder component 160 receives fixed value data from numerical range data 320 and prepares the fixed value data for model training processing component 310. For example, fixed value decoder component 160 receives fixed value data associated with embeddings data 325 and attribute data 330. The fixed value data is encrypted and, in some embodiments, the associated embeddings data and attributes data are also encrypted. In some embodiments, fixed value decoder component 160 receives encrypted fixed value data, encrypted associated fixed value embeddings from embeddings data 325, and encrypted associated fixed value attributes from attribute data 330. Fixed value decoder component 160 decrypts the encrypted fixed value data, the encrypted associated fixed value embeddings, and the encrypted associated fixed value attributes and inputs them as ordered features 340 in model building 205. Further details with regards to the operations of the fixed value decoder 160 are described below.

Data processing component 335 is coupled to each of numerical range data 320, embeddings data 325, and attribute data 330. Data processing component 335 therefore receives data from each of these data sources and processes and prepares the data to be input into model training processing component 310. For example, data processing component 335 splits the source data from numerical range data 320, embeddings data 325, and attribute data 330 into validation and training data sets. Data processing component 335 may randomly split the source data into validation and training data sets or may split the source data based on criteria such as a timestamp associated with the data. Data processing component 335 creates the training and validation data using the processed numerical range data 320, the processed embeddings data 325, and the processed attribute data 330. For example, data processing component 335 uses feature join to add the associated attributes and embeddings to the sampled, decrypted, and processed numerical range data 320 to create vectors for training and validation data. In some embodiments, the percentage of training data versus the percentage of validation data is based on determined percentages. In other embodiments, the training data and validation data may be determined based on characteristics in the specific data and the percentages may therefore be dynamically determined at runtime.

In some embodiments, data processing component 335 also filters the data to remove certain data points and transforms the data. For example, data processing component 335 removes outlier data from sampled values, such as the values that numerical data range sampler 150 samples from numerical range data 320. For example, the sampled values may be sampled from a numerical range where part or the entirety of the numerical range differs drastically from numerical ranges with similar embeddings and attributes. Therefore, all or some sampled values associated with the outlier numerical range may be removed. Data processing component 335 may also remove outlier values from the decrypted fixed value data decrypted by fixed value decoder 160. For example, the decrypted fixed values may include fixed values which differ drastically from most other fixed values with similar embeddings and attributes and are therefore removed. In some embodiments, data processing component 335 determines outliers to be removed based on mean and standard deviation data, based on preset thresholds, or on similar methods for outlier removal. For example, data processing component 335 may use data regarding the federal minimum wage to remove low outliers contained in salary data. Data processing component may also transform the data, with outliers removed to a log scale for processing by model training processing component 310.

Model training processing component 310 receives the training and validation data from data collection and processing component 305. Model training processing component 310 includes ordered features 340, model analysis component 350, and model building 205. Model building 205 includes ordered features 340, probabilistic layer 353, output mean 355, output standard deviation 355, actual output 347, predicted output 349, and loss 351. In some embodiments, model training processing component 310 is included in numerical data range sampler component 150 or fixed value decoder component 160. In other embodiments, model training processing component 310 is included in application software system 130. In still other embodiments, model training processing component 310 is a component separate from numerical data range sampler component 150, fixed value decoder component 160, and application software system 130. Model rewriter 360 is coupled to model training processing component 310 and coupled to network 120 for outputting the result of model training processing component 310.

Model building 205 is a component for training, validating, and executing a machine learning model. In some embodiments, model building 205 is a component for training, validating, and executing a neural network, such as a Bayesian neural network, that predicts an output from multiple inputs. For example, model building 205 uses ordered features 340 as inputs and creates a neural network with hidden layers such as probabilistic layer 353. Probabilistic layer 353 produces output mean 355 and output standard deviation 355. For example, the prediction problem may be modeled as $\hat{y}_i \sim N(\mu_i, \sigma_i)$, $f(x_i)=(\mu_i, \sigma_i)$ where f(.) is a deep regression model that takes in features and gives out distribution parameters mean $\mu_i$, or output mean 355 and standard deviation $\sigma_i$, or output standard deviation 357. $\hat{y}_i$, or predicted output 349 is a normal distribution taken from probability layer with mean $\mu_i$ (i.e., output mean 355) and standard deviation a t (i.e., output standard deviation 357).

Loss 351 is the result of a loss function based on actual output 347 and predicted output 349. In some embodiments, model building 205 minimizes the negative log-likelihood of loss 351 to train the machine learning model. For example, model building 205 minimizes the following formula for negative log-likelihood of loss, where $y_i$ represents actual output 347, $\mu_i$ represents output mean 355, and $\sigma_i$ represents output standard deviation 357.

$$NLL = N/2 * \log 2\pi + 1/2 * \left( \sum_{i=1}^{N} \log \sigma_i^2 + \sum_{i=1}^{N} (y_i - \mu_i)^2 / \sigma_i^2 \right)$$

In other embodiments, loss 351 is the result of other loss functions, such that model building 205 builds a model to correctly approximate predicted output 349 based on actual output 347. Actual output 347 is used during training and is the known output for training data used to train model building 205. In some embodiments, actual output 347 is a numerical value and in other embodiments, actual output 347 is a numerical range.

In some embodiments, various regularization schemes are used on model building 205 to provide smooth gradients, fast training, and accurate generalization. Such regularization schemes may include L2 normalization on weights, dropout, layer-normalization, batch-normalization, and similar regularization schemes.

Ordered features 340 are representations of training data, such as numerical range data 320, embeddings data 325, and attributes data 330 after the input data has been passed through data processing 335 and is ready to be used to build the machine learning model. Ordered features 340 are therefore used as inputs to model building 205.

Model analysis 350 receives a trained machine learning model from model building 205 and, in some embodiments, performs bulk inference and different privacy analysis on the trained machine learning model. For example, model analysis 350 may generate predicted outputs 349 for a batch of inputs and send the batch of predicted outputs to a data store, such as data store 140 for future access. Model analysis 350 may also run a privacy analysis to determine if encrypted training data that was decrypted by fixed value decoder 160 is recoverable. Model training processing component 310 sends the trained machine learning model to model rewriter 360.

Model rewriter 360 updates the trained machine learning model produced by model building 205 with filtering on a thresholding mechanism. For example, model rewriter 360 uses a thresholding mechanism to calculate a coefficient of variation defined as $$c_v = \mu/\sigma.$$

The coefficient of variation, based on output mean 355 and output standard deviation 357 is used to determine the quality of the predicted output 349. For example, a high $c_v$ indicates a tightly clustered distribution and therefore a good prediction whereas a low $c_v$ indicates a loosely clustered distribution and therefore a bad prediction. Because $c_v$ is dimensionless, it is preferred as a quality predictor over just using standard deviation, such as output standard deviation 357. In some embodiments, variational inference, ensemble-based techniques, and Monte-Carlo Dropout may be used to determine uncertainty.

In some embodiments, model rewriter 360 uses a deep ensemble method utilizing an ensemble of models with randomized different initialization of weights to produce different outputs. Model rewriter 360 calculates the uncertainty based on the different outputs from the ensemble of models. For example, a large variance in the outputs from the models means high uncertainty whereas low variance means low uncertainty.

In some embodiments, model rewriter 360 does not send the output to network 120 if the uncertainty associated with the output does not meet a threshold value. For example, for outputs with a high $c_v$ or a large variance, model rewriter 360 may determine that the output is uninformative or unreliable and not send the output to network 120. In some embodiments this determination is based on a threshold uncertainty value. The threshold uncertainty value may be determined by model rewriter 360 or may be predetermined. The threshold uncertainty value correlates with the uncertainty of the output and may include measurements from various uncertainty techniques, such as all the uncertainty techniques mentioned above.

Model rewriter 360 also takes the output mean 355 and output standard deviation 357 from model building 205 and outputs a range based on the thresholding mechanism. For example, model rewriter 360 receives a mean salary estimate, output mean 355 as well as output standard deviation 357 from model training processing component 310. Model rewriter 360 determines a range $$y_i^{min}$$

and $$y_i^{max}$$

based on output mean 355 and output standard deviation 357. In some embodiments, rather than outputting $$y_i^{min}$$

and $$y_i^{max}$$

as the range, model rewriter 360 outputs the α*100th and (1−α)*100th percentile from the distribution as the range, based on output mean 355 and output standard deviation 357.

Model rewriter 360 sends the range produced by model rewriter 360 to network 120. For example, model rewriter 360 may store the outputted range in a data store, such as data store 140 of FIG. 1 or may send the outputted range to an application software system, such as application software system 130 of FIG. 1 to be displayed on a user interface of a user system, such as user interface 112 and user system 110 of FIG. 1.

Figure 4:
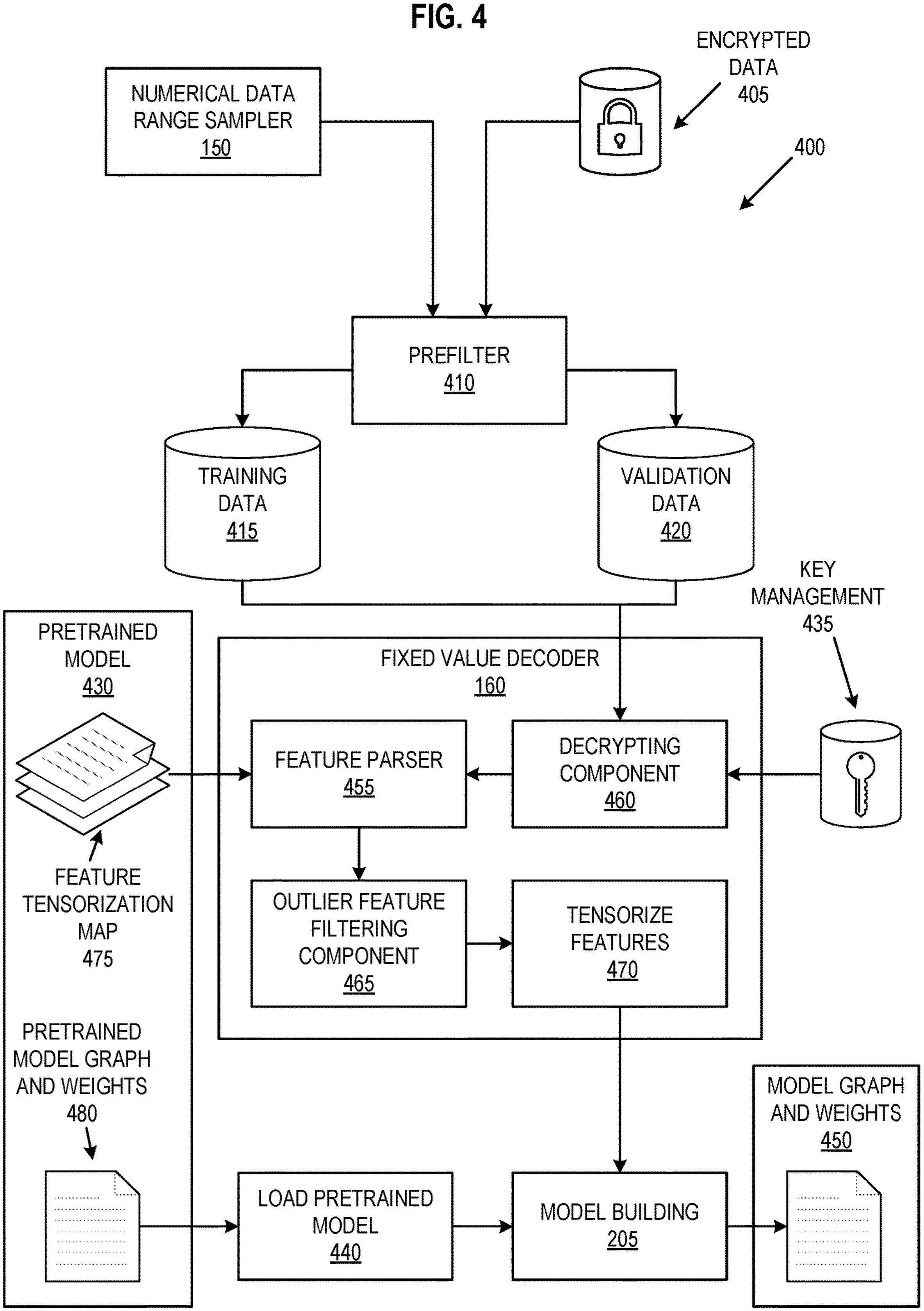
FIG. 4 is a block diagram of an exemplary system 400 for generating training data using sampled values in accordance with some embodiments of the present disclosure.

FIG. 4 is a block diagram of an exemplary system 400 for generating training data using sampled values in accordance with some embodiments of the present disclosure. Exemplary system 400 for generating training data including encrypted data 405, numerical data range sampler 150, prefilter 410, training data 415, validation data 420, fixed value decoder 160, key management 435, decrypting component 460, pretrained model 430, pretrained model loader 440, model building 205, and model graph and weights 450. Fixed value decoder 160 includes decrypting component 460, feature parser 455, outlier feature filtering component 465, and feature tensorizer 470. Pretrained model 430 includes feature tensorization map 475 and pretrained model graph and weights 480.

Encrypted data 405 includes submissions from users that may include encrypted fixed point values (such as those included in numerical range data 320 from FIG. 3), attribute data (such as attribute data 330 of FIG. 3), and embeddings data (such as embeddings data 325 of FIG. 3). In some embodiments, the encrypted fixed point values, encrypted embeddings data, and encrypted attribute data are encrypted using different encryption keys. In other embodiments, some of the data sources share encryption keys. In some embodiments, encrypted data 405 includes an associated unencrypted time stamp based on the time the user submission was received. This time stamp may have random variations built in to assure anonymity of the information.

Prefilter 410 may receive encrypted data 405 and sample value data from numerical data range sampler 150 and filter encrypted data 405 based on the associated time stamp. For example, prefilter 410 may combine the encrypted data 405 and the sample value data received from numerical data range sampler 150 and split both the encrypted and unencrypted source data into validation data 420 and training data 415. In some embodiments, the percentage of training data versus the percentage of validation data is based on determined percentages. In other embodiments, the training data and validation data may be determined based on characteristics in the specific data and the percentages may therefore be dynamically determined at runtime. Each of training data 415 and validation data 420 therefore contains both encrypted data 405 and unencrypted data from numerical data range sampler 150.

Fixed value decoder 160 receives training data 415 and validation data 420. Decrypting component 460 of fixed value decoder 160 receives encryption keys from key management 435 and uses the encryption keys to decrypt the encrypted training data 415 and validation data 420. To protect privacy of encrypted data 405, the decrypted data from decrypting component 460 is not stored on persistent storage. The decryption of the decrypted data from decrypting component 460 therefore is performed within a machine learning framework. In some embodiments the decrypted data from decrypting component 460 is cached in volatile memory to save compute time. In such embodiments, the decrypted data is cleared from the volatile cache once the training process finishes. For the unencrypted data in training data 415 and validation data 420, decrypting component 460 is bypassed (not shown). The decrypted data from decrypting component 460 and the unencrypted data from training data 415 and validation data 420 is then sent to feature parser 455.

In some embodiments, feature parser 455 also receives feature tensorization map 475 from pretrained model 430. For example, pretrained model 430 is a model already trained on similar datasets as training data 415 and validation data 420. Pretrained model 430 has a feature tensorization map 475 including information from the pretrained model 430 regarding the relationship between input vectors and an output matrix of a higher order. In some embodiments, fixed value decoder 160 uses the feature tensorization map 475 received from pretrained model 430 to tensorize features using feature tensorizer 470.

Feature parser 455 sends the parsed features to outlier feature filtering component 465. Outlier feature filtering component 465 removes outlier data from sampled values, such as the sample values that numerical data range sampler 150 samples from numerical range data and the fixed values decrypted by decrypting component 460. In some embodiments, outlier feature filtering component 465 also transforms the training and validation data 415 and 420, with outliers removed to a log scale for tensorizing by feature tensorizer 470. Outlier feature filtering component 465 may determine outliers to be removed based on mean and standard deviation data, based on preset thresholds, or on similar methods for outlier removal. For example, outlier feature filtering component 465 may use data regarding the federal minimum wage to remove low outliers contained in salary data.

In some embodiments, feature tensorizer 470 uses feature tensorization map 475 received from pretrained model 430 and the filtered features received from outlier feature filtering component 465 and tensorizes the features to input into model building 205. In other embodiments, feature tensorizer 470 develops its own feature tensorization map 475 instead of using feature tensorization map 475 from pretrained model 430. Feature tensorizer 470 maps the filtered feature vectors into higher-order tensor matrices for machine learning model training by model building 205.

In some embodiments, pretrained model loader 440 receives pretrained model graph and weights 480 from pretrained model 430 and sends pretrained model graph and weights 480 to model building 205. Model building 205 updates or trains the model based on the filtered feature vectors mapped into higher-order tensor matrices and the pretrained model graph and weights 480. In other embodiments, model building 205 does not receive pretrained model graph and weights 480 from pretrained model 430 and trains the model based on the filtered feature vectors mapped into higher-order tensor matrices. Model building 205 then outputs model graph and weights 450. In some embodiments, model graph and weights 450 is subjected to analysis by a model analyzer, such as model analysis component 350 of FIG. 3. Model graph and weights 450 may also be subjected to rewriting by a model rewriter, such as model rewriter 460 of FIG. 3.

Figure 5:
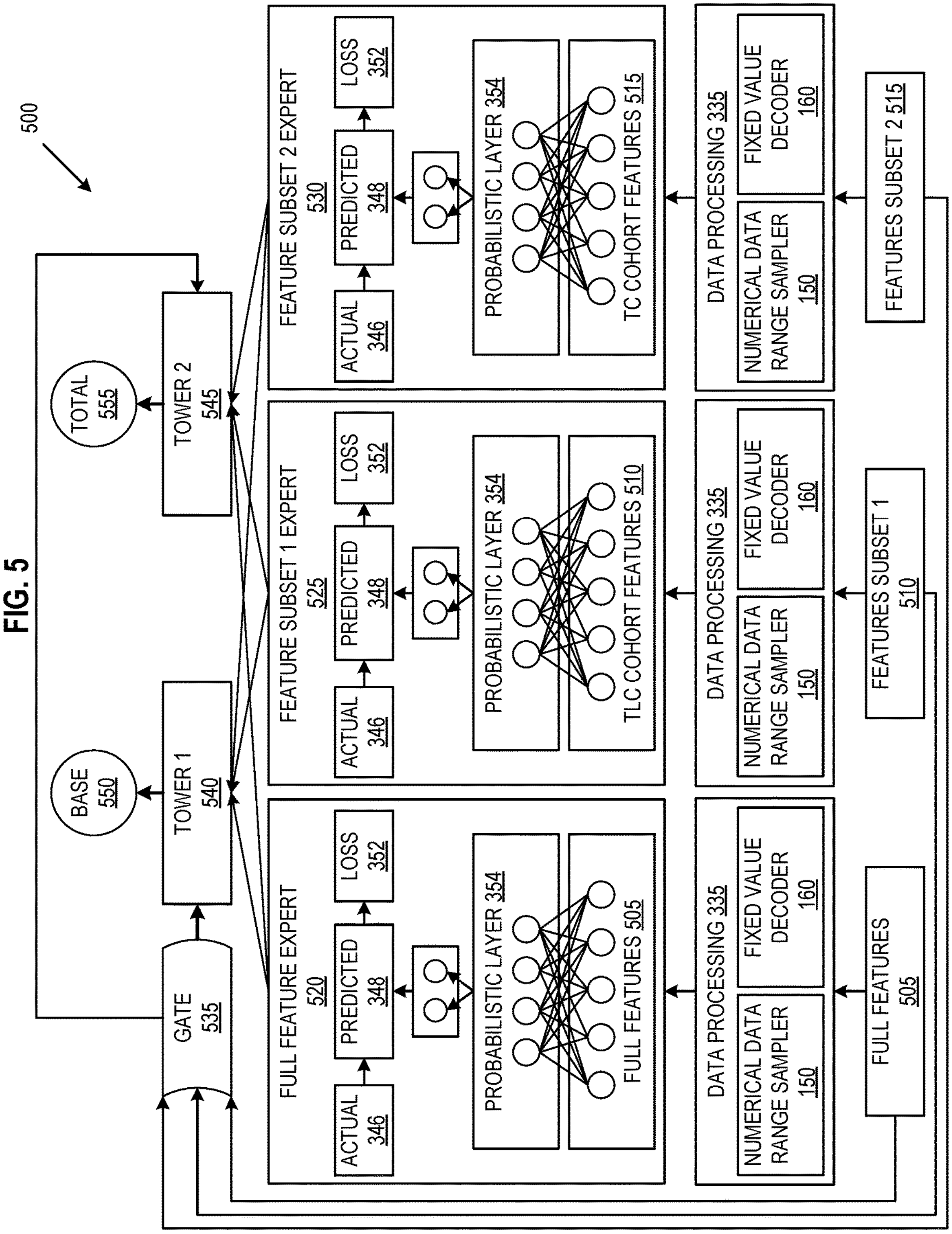
FIG. 5 is a block diagram of an exemplary system 500 to generate training data using sampled values in accordance with some embodiments of the present disclosure.

FIG. 5 is a block diagram of an exemplary system 500 to generate training data using sampled values in a mixture of experts framework in accordance with some embodiments of the present disclosure. Exemplary system 500 to generate training data using sampled values includes full features 505, features subset 1 510, and features subset 2 515. Each of these training feature sets may have features common amongst them as well as different training features. For the purposes of this disclosure, a cohort is described as a group of data vectors sharing common characteristics. For example, a cohort may be determined based on an attribute for the data such as a job title or entity. Features subset 1 510 only contains features relating to an entity associated with the job, a title of the job, and a location of the job. Features subset 2 515 only contains features relating to an entity associated with the job and a title of the job. Full features 505 contains all features including an entity associated with the job, a title of the job, a location of the job, skills relating to the job, and an industry associated with the job. Although these specific use cases are illustrated in exemplary system 500, different combinations of features and feature sets may be used. Additionally, although only three feature sets and therefore three experts are illustrated in exemplary system 500, fewer or more feature sets or experts may be used.

Full features 505, features subset 1 510, and features subset 2 515 are sent to data processing 335. Although shown as separate, the data processing for the feature sets may all occur in one component or at one time. In some embodiments, the feature sets 505, 510, and 515 have already been through data processing 335 and are sent to full feature expert 520, feature subset 1 expert 525, and feature subset 2 expert 530 respectively.

Each of full feature expert 520, feature subset 1 expert 525, and feature subset 2 expert 530 train and develop a model that outputs predicted 348 to minimize loss 352 between actual 346 and predicted 348. These models are based on probabilistic layers 354 and the associated feature sets as training data.

An exemplary version of the mixture of experts model with n experts may make predictions using the following equation:

$$y = \sum_{i=1}^{n} g(x_i) f_i(x)$$

where $$\sum\nolimits_{i=1}^{n} g(x_i) = 1$$

and where $g(x_i)$ is the ith logic of the output of g(x), which indicates the probability for expert $f_i$. The output for the mixture of experts is therefore based on the output for each expert and its associated probability.

The outputs of full feature expert 520, feature subset 1 expert 525, and feature subset 2 expert 530 are sent to both tower 1 540 and tower 2 545. Each of tower 1 540 and tower 2 545 use a gating mechanism, gate 535 to make the final predictions based on the output of each of the experts: full feature expert 520, feature subset 1 expert 525, and feature subset 2 expert 530. Tower 1 540 outputs the final prediction as base 550 and tower 2 545 outputs the final prediction as total 555. Full feature 505, features subset 1 510, and features subset 2 515 are inputs to gate 535. Gate 535 can use the different inputs, full feature 505, features subset 1 510, and features subset 2 515 to determine weights for the expert networks full feature expert 520, feature subset 1 expert 525, and feature subset 2 expert 530. Gate 535 is a network that learns the properties of the training data and therefore learns which experts to use for which use cases.

Tower 1 540 and tower 2 545 and their associated outputs, base 550 and total 555 therefore represent outputs for different use cases. For example, if using the mixture of experts model for salary estimation, different use cases could be predicting the salary of a job posting and predicting the salary of a person. Because these use cases are different, different feature sets as training data and therefore different experts would be more effective. Exemplary system 500 allows the same network to generate different predictions based on the use case.

Figure 6:
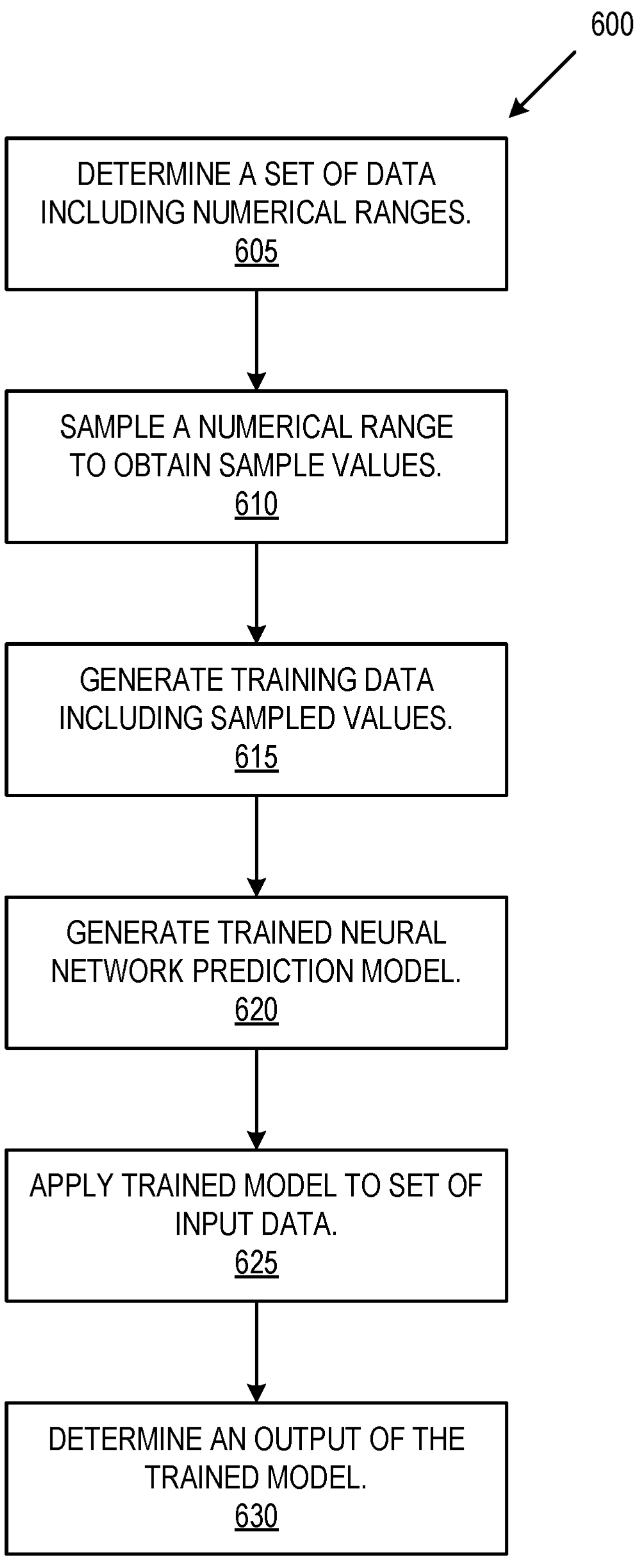
FIG. 6 is a flow diagram of an example method 600 to generate training data using sampled values in accordance with some embodiments of the present disclosure.

FIG. 6 is a flow diagram of an example method 600 to generate training data using sampled values, in accordance with some embodiments of the present disclosure. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by the numerical data range sampler component 150 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 605, the processing device determines a set of data including numerical ranges. For example, the processing device may determine a set of data including numerical ranges, associated embeddings data, and associated attribute data. In some embodiments, the numerical range data is salary range information and the associated attribute data includes an entity associated with the job, a title of the job, a location of the job, skills relating to the job, an industry the job is in, and combinations of the above. In such embodiments, embeddings data are vectors that relate jobs with other jobs. The embeddings also carry information about the job itself, including information stored in attributes. The embeddings also carry information about interactions between users and jobs.

In some embodiments the set of data further includes encrypted fixed value data, encrypted fixed value embeddings data, and encrypted fixed value attribute data. In such embodiments, the encrypted fixed value data represents a single salary value for a user, submitted confidentially. The encrypted fixed value attribute data includes the current job title of the user, the current location of the user, the current location of the user's job, the entity associated with the user's job, an industry associated with the user's job, and combinations of the above. Encrypted fixed value embeddings data carries information about the user, including information stored in attributes. The embeddings also carry information about interactions between the user and jobs. In some embodiments, the processing device also decrypts the encrypted data At operation 610, the processing device samples the numerical range to obtain sample values. For example, the processing device takes the numerical range data determined in operation 605 and samples the range to obtain sample values corresponding with the same attributes and embeddings as the original numerical range. For example, the processing device may sample certain percentiles within a range, such as the bottom, middle, and top of the range. In other embodiments, the processing device obtains samples randomly. Although the number of samples that the processing device obtains is not set, the more samples taken generally correlates with a better understanding of the entirety of the numerical range.

At operation 615, the processing device generates training data including the sampled values. For example, the processing device combines the sampled values with their associated embeddings and attributes to generate training data vectors. In some embodiments, the processing device also combines the decrypted data from operation 605 so that the fixed values are combined with their associated embeddings and attributes.

At operation 620, the processing device generates a trained neural network prediction model using the training data. For example, the processing device inputs the training data generated in 615 into a machine learning model.

At operation 625, the processing device applies the trained neural network prediction model to a set of input data. For example, the processing device uses the trained machine learning model from 620 to classify a set of input data. The input data is similar to the training data but, whereas the training data includes ground-truth samples of salary data, the input data does not contain such ground-truth data since the salary information is what will be predicted by the trained model based on the input data such that the output of the trained model is an estimation of the salary information for the embeddings and attributes in the input data.

At operation 630, the processing device determines an output of the trained neural network prediction model. For example, the processing device determines an output from the machine learning model trained in operation 620 based on the input data applied in operation 625. In some embodiments, the output is a mean and standard deviation of a predicted salary. In some embodiments, the mean and standard deviation are used to instead output a salary range.

FIG. 7 illustrates an example machine of a computer system 700 within which a set of instructions for causing the machine to perform any one or more of the methodologies discussed herein, can be executed. In some embodiments, the computer system 700 can correspond to a component of a networked computer system (e.g., the computer system 100 of FIG. 1) that includes, is coupled to, or utilizes a machine to execute an operating system to perform operations corresponding to the numerical data range sampler component 150 of FIG. 1. The machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a smart phone, a tablet PC, a set-top box (STB), a Personal Digital Assistant (PDA), a cellular telephone, a web appliance, a server, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random-access memory (DRAM) such as synchronous DRAM (SDRAM) or Rambus DRAM (RDRAM), etc.), a memory 706 (e.g., flash memory, static random-access memory (SRAM), etc.), an input/output system 710, and a data storage system 740, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 712 for performing the operations and steps discussed herein.

The computer system 700 can further include a network interface device 708 to communicate over the network 720. Network interface device 708 can provide a two-way data communication coupling to a network. For example, network interface device 708 can be an integrated-services digital network (ISDN) card, cable modem, satellite modem, or a modem to provide a data communication connection to a corresponding type of telephone line. As another example, network interface device 708 can be a local area network (LAN) card to provide a data communication connection to a compatible LAN. Wireless links can also be implemented. In any such implementation network interface device 708 can send and receive electrical, electromagnetic or optical signals that carry digital data streams representing various types of information.

The network link can provide data communication through at least one network to other data devices. For example, a network link can provide a connection to the world-wide packet data communication network commonly referred to as the "Internet," for example through a local network to a host computer or to data equipment operated by an Internet Service Provider (ISP). Local networks and the Internet use electrical, electromagnetic or optical signals that carry digital data to and from computer system computer system 700.

Computer system 700 can send messages and receive data, including program code, through the network(s) and network interface device 708. In the Internet example, a server can transmit a requested code for an application program through the Internet and network interface device 708. The received code can be executed by processing device 702 as it is received, and/or stored in data storage system 740, or other non-volatile storage for later execution.

The input/output system 710 can include an output device, such as a display, for example a liquid crystal display (LCD) or a touchscreen display, for displaying information to a computer user, or a speaker, a haptic device, or another form of output device. The input/output system 710 can include an input device, for example, alphanumeric keys and other keys configured for communicating information and command selections to processing device 710. An input device can, alternatively or in addition, include a cursor control, such as a mouse, a trackball, or cursor direction keys for communicating direction information and command selections to processing device 710 and for controlling cursor movement on a display. An input device can, alternatively or in addition, include a microphone, a sensor, or an array of sensors, for communicating sensed information to processing device 710. Sensed information can include voice commands, audio signals, geographic location information, and/or digital imagery, for example.

The data storage system 740 can include a machine-readable storage medium 742 (also known as a computer-readable medium) on which is stored one or more sets of instructions 744 or software embodying any one or more of the methodologies or functions described herein. The instructions 744 can also reside, completely or at least partially, within the main memory 704 and/or within the processing device 702 during execution thereof by the computer system 700, the main memory 704 and the processing device 702 also constituting machine-readable storage media.

In one embodiment, the instructions 726 include instructions to implement functionality corresponding to a numerical data range sampler component (e.g., the numerical data range sampler component 150 of FIG. 1). While the machine-readable storage medium 742 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the computing system 100, can carry out the computer-implemented method 600 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

Illustrative examples of the technologies disclosed herein are provided below. An embodiment of the technologies may include any of the examples or a combination of the described below.

An example 1 includes: determining a set of data comprising numerical range, embeddings, and attributes, sampling the numerical range to obtain sample values, generating a set of training data from the sample values, embeddings, and attributes, generating a trained neural network prediction model, applying the trained neural network prediction model to input data, and determining an output.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:

determining a set of data, the set of data comprising a plurality of numerical ranges, a plurality of embeddings, and a plurality of attributes, wherein a numerical range of the plurality of numerical ranges is associated with at least one embedding of the plurality of embeddings and at least one attribute of the plurality of attributes;

sampling the numerical range to obtain a plurality of sample values, wherein a first sample value and a second sample value of the plurality of sample values are different discrete point values sampled from the numerical range and are associated with the at least one embedding and the at least one attribute;

generating a set of sample value training data comprising a plurality of sample value training vectors, wherein a first sample value training vector of the plurality of sample value training vectors is based on the first sample value, the at least one associated embedding, and the at least one associated attribute and wherein a second sample value training vector of the plurality of sample value training vectors is based on the second sample value, the at least one associated embedding, and the at least one associated attribute;

mapping the set of sample value training data to a sample value tensor using a feature tensorization map;

training a neural network prediction model to minimize a loss of an output of the neural network prediction model based on the sample value tensor; and determining, by the trained neural network prediction model, an output based on a set of input data, the set of input data comprising at least one input embedding and at least one input attribute, wherein the output is a predicted range of values based on an output mean and an output standard deviation.

2. The method of claim 1, wherein determining, by the trained neural network prediction model, the output further comprises determining an output uncertainty, and the method further comprises:

causing the output to be presented on a computing device in response to determining that the output uncertainty exceeds a threshold.

3. The method of claim 2, wherein determining the output uncertainty further comprises:

determining a coefficient of variation based on the output mean and the output standard deviation; and wherein determining whether the output uncertainty satisfies a threshold uncertainty comprises determining whether the coefficient of variation satisfies the threshold uncertainty.

4. The method of claim 3, wherein the neural network prediction model comprises a plurality of ensemble models, an ensemble model of the plurality of ensemble models has a random initialization of weights different from other ensemble models of the plurality of ensemble models, and determining the output uncertainty further comprises:

calculating a variance of a plurality outputs of the plurality of ensemble models; and wherein determining whether the output uncertainty satisfies a threshold uncertainty further comprises determining whether the variance satisfies the threshold uncertainty.

5. The method of claim 2, wherein the set of data further comprises a plurality of fixed values, and the method further comprises:

generating a set of fixed value training data comprising a plurality of fixed value training vectors, wherein a fixed value training vector of the plurality of fixed value training vectors is based on a fixed value of the plurality of fixed values, not sampled from a numerical range, at least one associated fixed value embedding, and at least one associated fixed value attribute;

mapping the set of fixed value training data to a fixed value tensor using the feature tensorization map; and wherein training the neural network prediction model to minimize the loss of the output of the neural network prediction model is further based on the fixed value tensor.

6. The method of claim 5, wherein the sample value tensor and the fixed value tensor are of a same order.

7. The method of claim 5, wherein generating the set of fixed value training data further comprises, for the fixed value training vector of the plurality of fixed value training vectors:

determining the fixed value, the at least one associated fixed value embedding, and the at least one associated fixed value attribute, wherein the fixed value, the at least one associated fixed value embedding, and the at least one associated fixed value attribute are encrypted; and decrypting the encrypted fixed value, the encrypted at least one associated fixed value embedding, and the encrypted at least one associated fixed value attribute.

8. The method of claim 7, wherein the neural network prediction model comprises at least a first expert model and a second expert model, and the method further comprises:

training the first expert model by updating parameters of the first expert model to minimize a loss of an output of the first expert model based on a first subset of the set of sample value training data;

training the second expert model by updating parameters of the second expert model to minimize a loss of an output of the second expert model based on a second subset of the set of sample value training data, wherein the first subset and the second subset include a different number of attributes of the plurality of attributes;

determining, by the first expert model, a first expert output based on the set of input data;

determining, by the second expert model, a second expert output based on the set of input data; and wherein determining the output further comprises:

determining, by a gating network, a first output probability associated with the first expert output;

determining, by the gating network, a second output probability associated with the first expert output; and determining the output based on the first expert output, the second expert output, the first output probability, and the second output probability.

9. The method of claim 1, wherein determining the set of data comprising the plurality of attributes further comprises:

determining the plurality of attributes, wherein the at least one attribute of the plurality of attributes comprises two or more of entity, title, location, industry, and skills.

10. The method of claim 1, wherein determining the set of data comprising the plurality of embeddings further comprises:

determining the plurality of embeddings, wherein the embedding of the plurality of embeddings comprises a vector measuring similarity between separate attributes of the plurality of attributes.

11. A system comprising:

at least one memory device; and a processing device, operatively coupled with the at least one memory device, to:

determine a set of data, the set of data comprising a plurality of numerical ranges, a plurality of embeddings, and a plurality of attributes, wherein a numerical range of the plurality of numerical ranges is associated with at least one embedding of the plurality of embeddings and at least one attribute of the plurality of attributes;

sample the numerical range to obtain a plurality of sample values, wherein a first sample value and a second sample value of the plurality of sample values are different discrete point values sampled from the numerical range and are associated with the at least one embedding and the at least one attribute;

generate a set of sample value training data comprising a plurality of sample value training vectors, wherein a first sample value training vector of the plurality of sample value training vectors is based on the first sample value, the at least one associated embedding, and the at least one associated attribute and wherein a second sample value training vector of the plurality of sample value training vectors is based on the second sample value, the at least one associated embedding, and the at least one associated attribute;

mapping the set of sample value training data to a sample value tensor using a feature tensorization map;

train a neural network prediction model by updating parameters of the neural network prediction model to minimize a loss of an output of the neural network prediction model based on the sample value tensor; and determine, by the trained neural network prediction model, an output based on a set of input data, the set of input data comprising at least one input embedding and at least one input attribute, wherein the output is a predicted range of values based on an output mean and an output standard deviation.

12. The system of claim 11, wherein determining, by the trained neural network prediction model, the output further comprises determining an output uncertainty, and wherein the processing device is further to:

determine whether the output uncertainty satisfies a threshold uncertainty; and cause the output to be presented on a computing device in response to determining that the output uncertainty exceeds the threshold uncertainty.

13. The system of claim 12, wherein determining the output uncertainty further comprises:

determining a coefficient of variation based on the output mean and the output standard deviation; and wherein determining whether the output uncertainty satisfies a threshold uncertainty comprises determining whether the coefficient of variation satisfies the threshold uncertainty.

14. The system of claim 13, wherein the neural network prediction model comprises a plurality of ensemble models, an ensemble model of the plurality of ensemble models has a random initialization of weights different from other ensemble models of the plurality of ensemble models, and determining the output uncertainty further comprises:

calculating a variance of a plurality outputs of the plurality of ensemble models; and wherein determining whether the output uncertainty satisfies a threshold uncertainty further comprises determining whether the variance satisfies the threshold uncertainty.

15. The system of claim 12, wherein the set of data further comprises a plurality of fixed values, and wherein the processing device is further to:

generate a set of fixed value training data comprising a plurality of fixed value training vectors, wherein a fixed value training vector of the plurality of fixed value training vectors is based on a fixed value of the plurality of fixed values, not sampled from a numerical range, at least one associated fixed value embedding, and at least one associated fixed value attribute;

map the set of fixed value training data to a fixed value tensor using the feature tensorization map; and wherein training the neural network prediction model by updating the parameters of the neural network prediction model to minimize the loss of the output of the neural network prediction model is further based on the fixed value tensor.

16. The system of claim 15, wherein the sample value tensor and the fixed value tensor are of a same order.

17. The system of claim 15, wherein generating the set of fixed value training data further comprises, for the fixed value training vector of the plurality of fixed value training vectors:

determining the fixed value, the at least one associated fixed value embedding, and the at least one associated fixed value attribute, wherein the fixed value, the at least one associated fixed value embedding, and the at least one associated fixed value attribute are encrypted; and decrypting the encrypted fixed value, the encrypted at least one associated fixed value embedding, and the encrypted at least one associated fixed value attribute.

18. The system of claim 17, wherein the neural network prediction model comprises at least a first expert model and a second expert model, and wherein the processing device is further to:

train the first expert model by updating parameters of the first expert model to minimize a loss of an output of the first expert model based on a first subset of the set of sample value training data;

train the second expert model by updating parameters of the second expert model to minimize a loss of an output of the second expert model based on a second subset of the set of sample value training data, wherein the first subset and the second subset include a different number of attributes of the plurality of attributes;

determine, by the first expert model, a first expert output based on the set of input data;

determine, by the second expert model, a second expert output based on the set of input data; and wherein determining the output further comprises:

determining, by a gating network, a first output probability associated with the first expert output;

determining, by the gating network, a second output probability associated with the first expert output; and determining the output based on the first expert output, the second expert output, the first output probability, and the second output probability.

19. The system of claim 11, wherein determining the set of data comprising the plurality of attributes further comprises:

determining the plurality of attributes, wherein the at least one attribute of the plurality of attributes comprises two or more of: entity, title, location, industry, and skills.

20. The system of claim 11, wherein determining the set of data comprising the plurality of embeddings further comprises:

determining the plurality of embeddings, wherein the embedding of the plurality of embeddings comprises a vector measuring similarity between separate attributes of the plurality of attributes.

* * * * *